United States Patent [19]

Rohra et al.

[11] Patent Number: 5,627,940
[45] Date of Patent: May 6, 1997

[54] METHOD AND APPARATUS FOR INTERACTIVE DOCUMENT PREPARATION USING A NATURAL LANGUAGE

[75] Inventors: Aruna Rohra, Yokohama; Hiroshi Matsuoka, Atsugi, both of Japan

[73] Assignee: Canon Kabushiki Kaisha, Tokyo, Japan

[21] Appl. No.: 373,538

[22] Filed: Jan. 17, 1995

Related U.S. Application Data

[63] Continuation of Ser. No. 689,510, Apr. 23, 1991, abandoned.

[30] Foreign Application Priority Data

Apr. 26, 1990 [JP] Japan ..................... 2-114593

[51] Int. Cl.6 .................... G06F 17/20; G06F 17/28
[52] U.S. Cl. .................. 395/12; 395/605; 395/759; 395/768
[58] Field of Search .................. 395/12, 600, 149; 364/DIG. 1, DIG. 2, 419.08

[56] References Cited

U.S. PATENT DOCUMENTS

| | | | |
|---|---|---|---|
| 4,491,933 | 1/1985 | Ursin et al. | 364/419 |
| 4,553,860 | 11/1985 | Imaizumi et al. | 400/68 X |
| 4,648,044 | 3/1987 | Hardy et al. | 395/76 |
| 4,689,737 | 8/1987 | Grant | 364/419 |
| 4,730,270 | 3/1988 | Okajima et al. | 364/419 |
| 4,736,296 | 4/1988 | Katayama et al. | 364/419 |
| 4,763,277 | 8/1988 | Ashford et al. | 395/65 |
| 4,809,219 | 2/1989 | Ashford et al. | 395/54 |
| 4,974,191 | 11/1990 | Amirghodsi et al. | 395/275 |
| 5,172,313 | 12/1992 | Schumacher | 364/401 |
| 5,197,005 | 3/1993 | Shwartz et al. | 364/419 |
| 5,282,265 | 1/1994 | Suda et al. | 395/12 |

FOREIGN PATENT DOCUMENTS

| | | |
|---|---|---|
| 0268367 | 5/1988 | European Pat. Off. . |
| 61-15267 | 1/1986 | Japan . |
| 2153560 | 8/1985 | United Kingdom . |

OTHER PUBLICATIONS

Everest, Gordon, C., "Database Management, Objectives, System Functions, and Administration," 1986 by McGraw-Hill, Inc., pp. 159-196; 257-306.

*Primary Examiner*—Paul V. Kulik
*Attorney, Agent, or Firm*—Fitzpatrick, Cella, Harper & Scinto

[57] ABSTRACT

In an information processing system for executing processing according to information input using a natural language, models of a dialogue between the user and the system according to the processing fields are stored, the processing field of the input information is specified, and questions for obtaining responses (inputs of necessary data) using simple expressions from the user are provided according to the model. Language expressions which the user can use for inputting commands are thereby limited, and processing is executed according to the obtained responses.

10 Claims, 4 Drawing Sheets

FIG. 4

① USER: letter

② SYSTEM: Hello! Can I write/help you to write any letter?
May I know, who the letter shall be from?

③ USER: Aruna.

④ SYSTEM: Thank you. Whom shall the letter be addressed to?

⑤ USER: Schank.

⑥ SYSTEM: Sorry, I don't know that person.
Is that his surname?

⑦ USER: Yes.

⑧ SYSTEM: What's his name?

⑨ USER: Roger.

⑩ SYSTEM: I see.
Where does he work?
Could you please give me his address as well,
so that I don't have to ask you for it later?

⑪ USER: Yale University. Dept. of Computer Science
Yale, New Haven, Connecticut, USA ⑫ SYSTEM: Thank you. I presume he works on nl processing. OK?

⑬ USER: Yes.

⑭ SYSTEM: What is the letter to be about?
It would be easy for me to know,
which one of the following
Get Information, Visit him, Schedule a meeting, ···

⑮ USER: Visit him.

⑯ SYSTEM: OK. I'll try to write the letter now; please wait.

5,627,940

METHOD AND APPARATUS FOR INTERACTIVE DOCUMENT PREPARATION USING A NATURAL LANGUAGE

This application is a continuation, of application Ser. No. 07/689,510, filed Apr. 23, 1991, now abandoned.

BACKGROUND OF THE INVENTION

1. Field of the Invention

This invention relates to an information processing system which allows the user to input data and instructions for various kinds of processing without using complicated commands.

2. Description of the Prior Art

Heretofore, in an information processing system, such as a computer or the like, instructions for executing a program desired by the user must have been previously defined commands, such as "run", "compile" and the like, or must have had the form of a set of program statements described in a computer language, such as Basic, Fortran or the like.

Recently, methods have been studied wherein commands are input using a natural language by providing a processing unit capable of understanding a natural language in an interface of an information processing system.

However, when using program statements as instructions in the above-described conventional information processing system, a high-level knowledge of programming is required of the user. Even when using only pre-defined commands, it is necessary to understand and memorize the commands.

On the other hand, when commands are input using a natural language, the user need not learn a computer language since he can utilize a commonly used language. However, it is rather difficult from a technical point of view to construct (particularly when the object of the use is general) an interface which makes it possible to input commands by a natural language.

SUMMARY OF THE INVENTION

It is an object of the present invention to provide an information processing system which can perform processing in specified fields by inputting commands using a natural language.

It is another object of the present invention to provide an information processing system which can input commands according to interactive processing using a natural language.

It is still another object of the present invention to provide an information processing system which can process various kinds of commands input using a natural language without having a high proficiency in understanding the natural language.

According to one aspect, the present invention achieves these objectives using an information processing system comprising input means for inputting information/commands from a user, processing means for performing processing according to the information/commands input by the input means, storage means for correspondingly storing kinds/attributes of information needed to be input for the processing by the processing means, and questions to be provided from the system to the user in order to obtain the information, data base means for storing kinds/attributes, meanings and related information of various kinds of information, output means for providing the user with a question stored in the storage means, referring means for referring to the stored contents of the data base means relating to information input to the input means in response to the question from the output means, comparison means for comparing a kind/attribute of the response information which is determined as a result of reference by the referring means with a kind/attribute of information expected in response to the question from the output means, and control means for controlling the processing means according to a result of comparison by the comparison means.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 illustrates a dialogue between a user and a system.

DESCRIPTION OF THE PREFERRED EMBODIMENT

A preferred embodiment of the present invention will now be explained with reference to the drawings.

Figure 1:
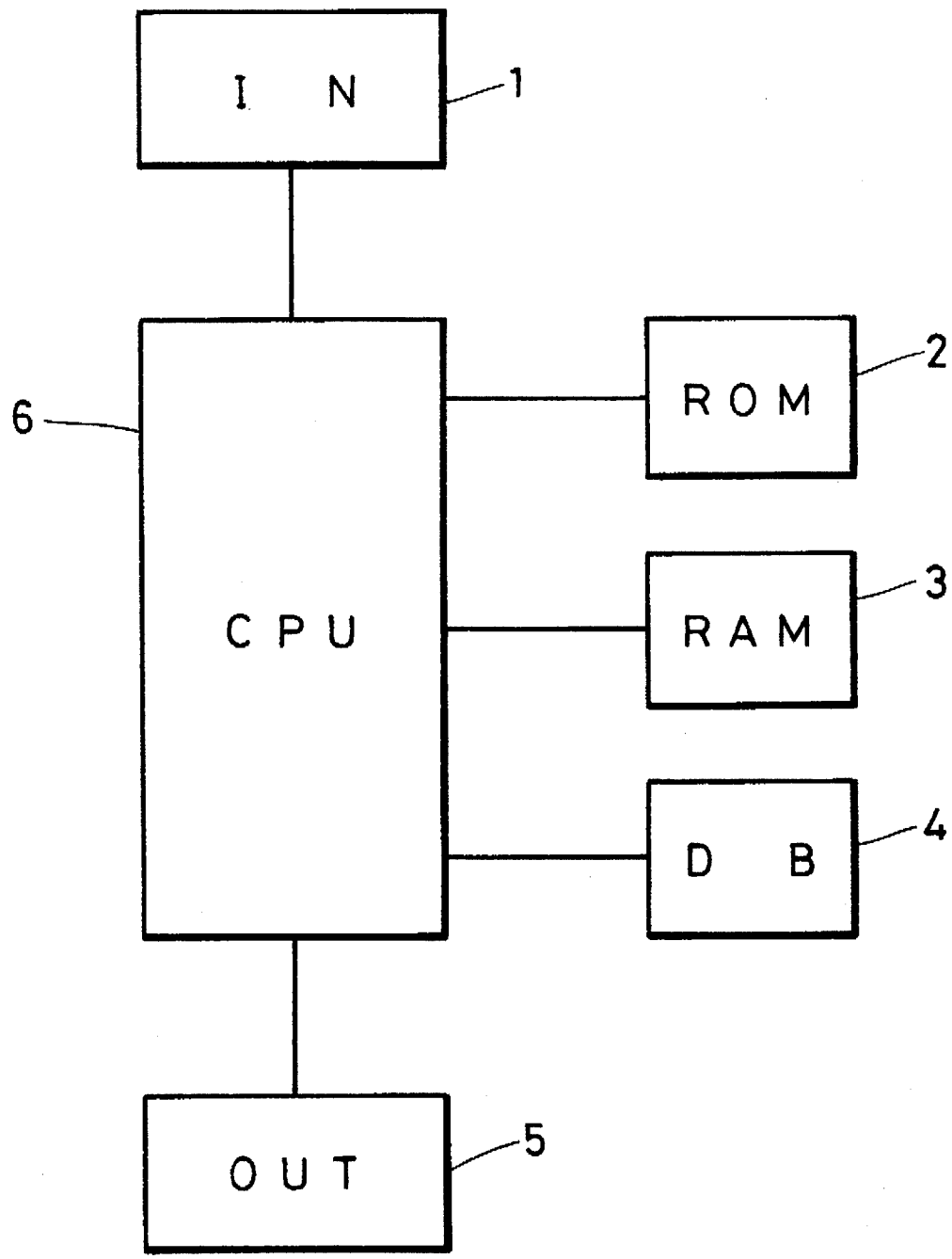
FIG. 1 is a system block diagram of an information processing apparatus according to the present invention.

FIG. 1 is a block diagram of an information processing system according to the present invention.

In FIG. 1, an input unit 1 (IN) comprises a keyboard, a mouse and the like, and is used for the input of information/commands from the user.

A read-only memory 2 (ROM) stores various kinds of processing procedures including processing procedures shown in flowcharts of FIGS. 2 and 3 (to be described later), fixed data and the like. A random access memory 3 (RAM) includes areas used as work memories.

Data base 4 (DB) stores kinds, attributes, meanings, related information and the like of various kinds of information, and can update its contents. In the present embodiment, a model of a dialogue between a user and a system (to be described later) according to the present invention is also stored in the DB.

A central processing unit 6 (CPU), for example, reads data from the ROM, RAM, DB and the like, determines data (i.e., determines which of the information in the data base coincides with the information received in response to a question), and controls respective units.

An output unit 5 (OUT), which comprises a display unit, a printer and the like, provides the user with questions, and outputs results of processing.

an explanation will now be provided of the processing operation of the information processing system of the present invention, using a system of preparing a letter according to information from the user. In this system, information relating to the property and contents of the letter to be written is obtained from the user, and the letter is prepared in accordance with the information.

In the above-described system, the present invention is applied in the form of obtaining various kinds of information (the receive, the sender, the object of the letter, and the like) to be utilized in preparing the letter from the user in response to individual questions for each information, according to a model of questions from a system and responses from a user for preparing a letter. It is thereby possible to receive responses from the user in the form of short answers, and to prevent inputs of sentences of a natural language (for example, ordinary long English sentences) by the user. Accordingly, the system need not truly understand a natural language to extract useful information from sentences.

Figure 2:
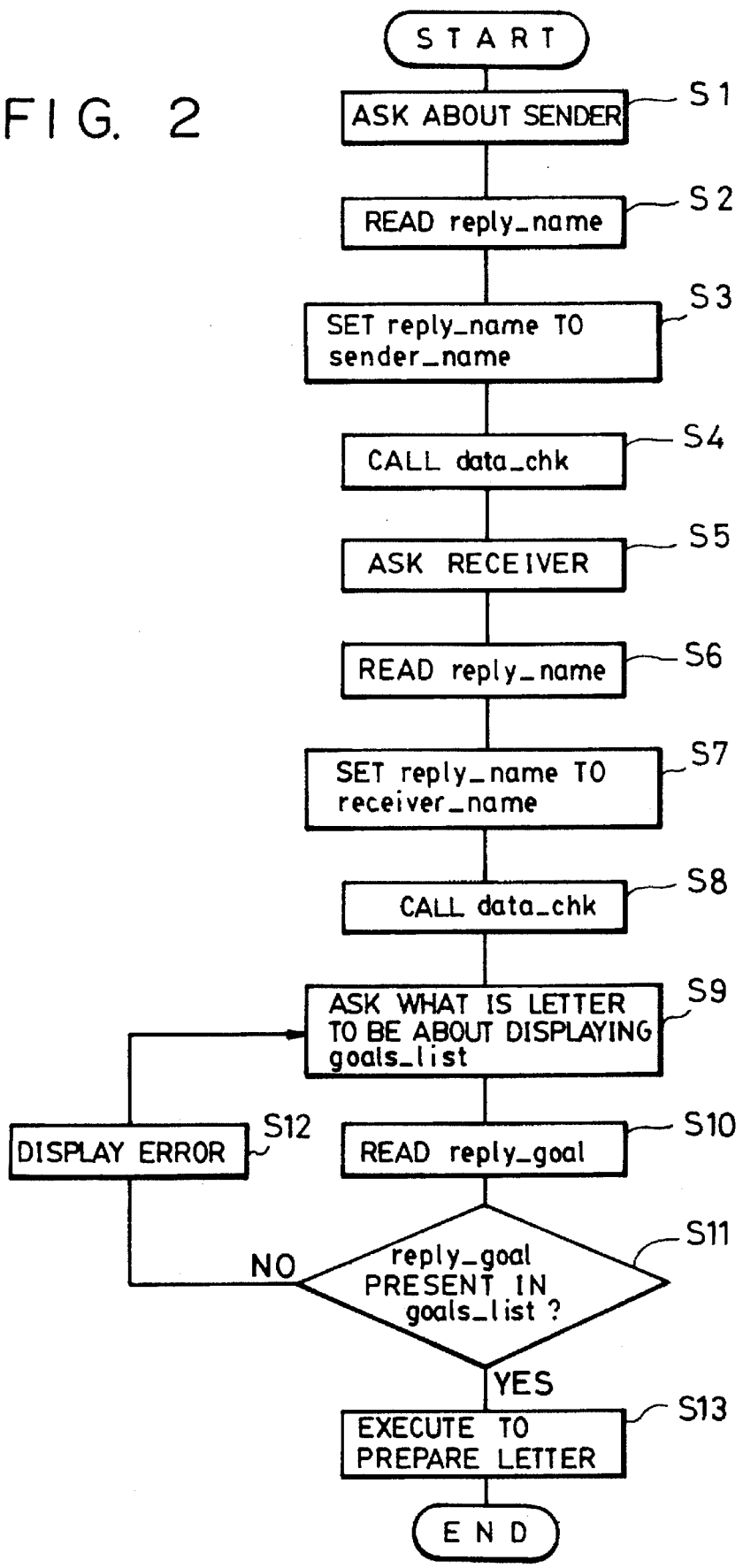
FIG. 2 is a flowchart for preparing a letter.
Figure 3:
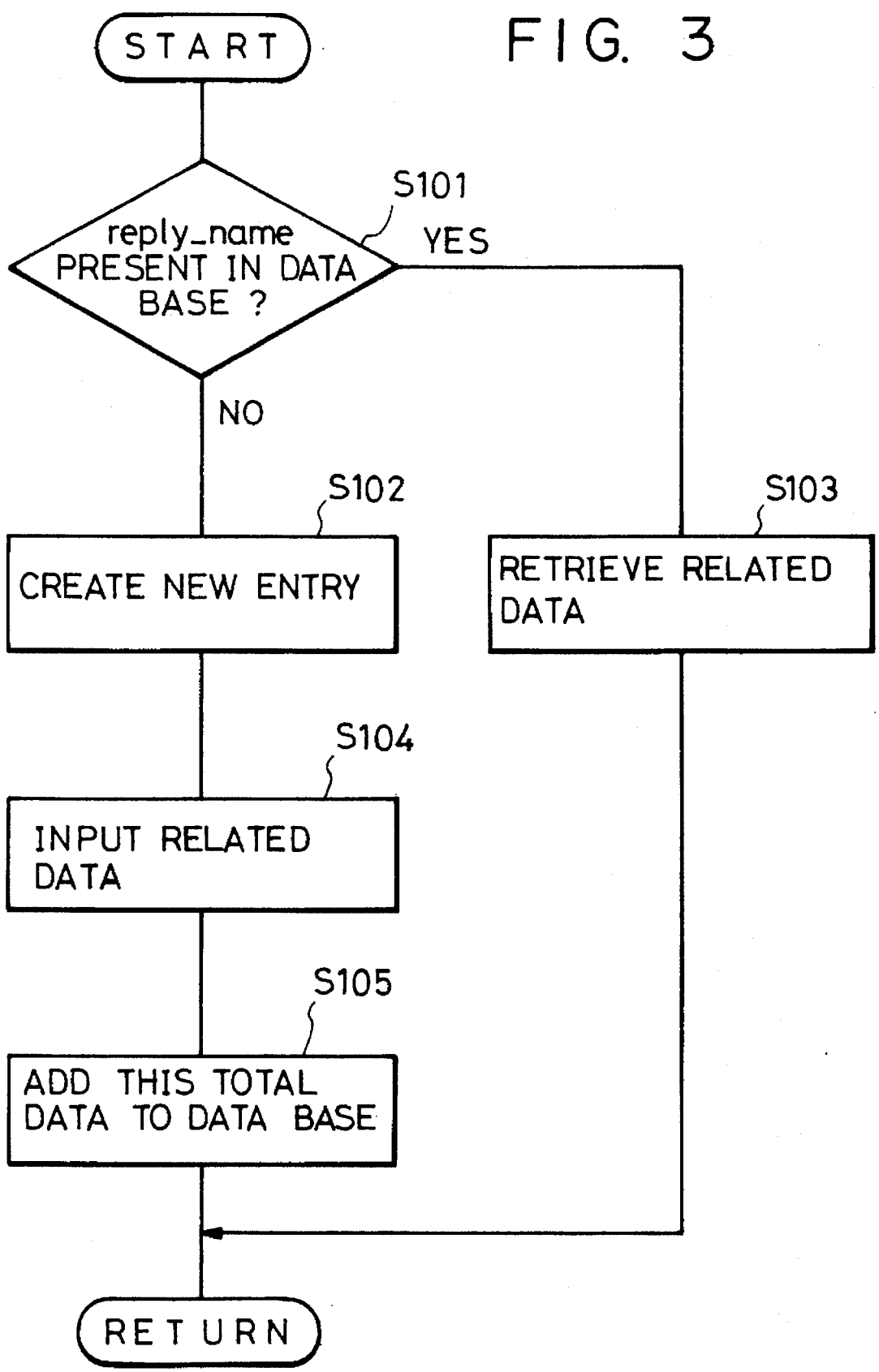
FIG. 3 is a flowchart for data check.

Next, an explanation will be provided of specific processing with reference to flowcharts shown in FIGS. 2 and 3, illustrating a dialogue between a user and a system shown in FIG. 4.

First, in FIG. 4, processing for preparing a letter is started according to "letter" in item ①. Next, in item ②, a message "Hello! Can I write/help you to write any letter?" is displayed, and asks about the sender of the letter to be prepared by displaying a message "May I known, who the letter shall be from?". In general, the user=the sender, but the sender does not always coincide with the user, since a secretary may, for example, write a letter in place of her employer (the above-described items belong to step S1). Next, in item ③, "Aruna" input as a variable "reply_name" is set to a variable "sender_name" as a response to the question (steps S2–S3). The system then executes a subprogram "data_chk" (step S4). The flow of "data_chk" is shown in FIG. 3. Suppose that the following entries are found at step S101.

|  |  |
| --- | --- |
| Name | Aruna |
| Surname | Rohra |
| Affiliation | Canon Inc. |
| Working on | nl processing |
| — | — |
| — | — |
| — | — |

In the present case, since "Aruna", serving as reply_name, is present in the data base as Name, properties required for variables coincide with each other. In the foregoing entries, "nl processing" indicates "natural language processing". The above-described information is stored in a work memory (step S103). In other words, the subprogram "data_chk" determines which of the information stored in the data base means coincides with the information received in response to the question. In item ④, together with a message "Thank you", the receiver of the letter is obtained by asking the following question: "Whom shall the letter be addressed to?" (step S5). A message "Schank" in item ⑤, serving as the reply for the question, is provided as "reply_name", is set to "receiver_name", and "data_chk" is executed again (step S8). Since the value "Schank" of "reply_name" is not found in the data base at step S101, a message "Sorry, I don't know that person" is displayed in item ⑥, and a question "Is that his surname?" is asked according to the knowledge possessed by the data base that a person is often called by his surname in a letter. Since an answer "Yes" for the question is obtained in item ⑦, a question "What's his name?" is asked in item ⑧, and an answer "Roger" in item ⑨ is obtained. Based on knowledge about first names, the system concludes that Roger is a male, and so can be represented by the word "he" in the letter. Accordingly, in item ⑩, a message "I see" is displayed. If an input first name is an unknown first name, and the system cannot determine the sex of the person, the system asks the user about the sex of the person, and ads obtained information to the data base as knowledge. In item ⑩, the system requests information for preparing a data base for Roger according to a question "Where does he work? Could you please give me his address as well, so that I don't have to ask you for it later?". In item ⑪, an address "Yale University. Dept. of Computer Science Yale, New Haven, Conn., USA" is input (the data base may be structured so that "New Haven, Conn., USA" is obtained from "Yale University". Furthermore, if it is structured so that the correct address can be obtained, the address may be used as the address of the receiver). In item ⑫, a message "Thank you" is displayed. Subsequently, in order to input a "work", the system presumes, from the model for preparing a letter that the sender and the receiver have in general a common interest, that, in this case, nl processing is the field of work, that is, the "work" of the receiver is the same as that of the sender. Hence, the system asks a question "I presume he works on nl processing. OK?". Since the question is affirmed by "Yes" in item ⑬, the information is stored as his work in the data base, and is also stored in a work memory (the above-described items belong to steps S102, S104 and S105).

Subsequently, in item ⑭, the object of the letter is asked by the question "What is the letter to be about?". At that time, objects stored in "goals_list" of the data base are shown by "It would be easy for me to know, which one of the following—Get Information, Visit him, Schedule a meeting, - - - ", and the user is anticipated selecting one of the provided objects. Since an answer "Visit him" in item ⑮ is present in "goals_list" (steps S10–S11), a message "OK. I'll try to write the letter now; please wait" is displayed in item ⑯. At step S13, the preparation of the letter is executed according to the input information. If an input in item ⑮ is not present in "goals_list", the fact is displayed (step S12), and another input is awaited.

As explained above, according to the present invention, since the user can input information in the form of short answers using a commonly-used language even if he does not have knowledge about commands, an input method is simplified.

Also on the system side, since a "true" analysis of a natural language is not needed, it is possible to reduce the amount of programs which have previously been needed for processing a natural language input.

What is claimed is:

1. A method for preparing a document in a text preparation apparatus comprising the steps of:

storing information relating to words to be received from a user in a database, the information relating to the word including attribution thereof and being stored prior to receiving the word from the user;

storing questions to be provided to the user in order to obtain words as answers from the user in a question memory, wherein each of the questions corresponds to respective attributions of the words needed to be input as the answer and requests a brief answer in the form of a word or a phrase, the questions being stored prior to receiving the word from the user;

providing the user with a question stored in the question memory, the question corresponding to an attribution of the word needed to be input as an answer;

receiving an answer from the user in response to the provided question;

determining whether or not the word received from the user as the answer is stored in the database;

retrieving the information stored in the database relating to the word received from the user when the word is determined to be stored in the database;

providing the user with another question to obtain information relating to the word and storing the word with information to be obtained in response to the other question in the database when the word is determined to be stored in the database; and preparing a document and incorporating the word received from the user as the answer and the information retrieved from the database relating to the received word into the document.

2. A method according to claim 1, wherein the answer input in said receiving step is in a natural language.

3. A method according to claim 1, wherein the question provided to the user is in a natural language.

4. A method according to claim 1, wherein said document preparing step includes preparing a letter according to the input information.

5. A method according to claim 1, wherein said document preparing step includes preparing the document based on the previous answer and the further information relating to the previous answer.

6. A document preparation apparatus comprising:

input means for inputting a word from a user;

database means for storing, relating to words to be input by said input means, information including attribution of the word;

storage means for storing questions to be provided to the user in order to obtain words as answers from the user, wherein each of the questions corresponds to respective attributions of the words needed to be input as the answer and requests a brief answer in the form of a word or a phrase;

output means for providing the user with a question stored in said storage means, the question corresponding to an attribution of the word needed to be input as an answer;

retrieving means for retrieving the information relating to the word input by said input means as the answer to the question provided by said output means, from said database means;

document preparation means for preparing a document by incorporating the word input as the answer by said input means and the information retrieved by said retrieving means relating to the answer into the document;

determining means for determining whether the word input from the user as the answer in response to the question from said output means, is stored in said database means; and control means for controlling said output means to provide another question to obtain information relating to the word and controlling said database means to store the word with information to be obtained in response to the other question when said determining means determines that the word is not stored in said database means.

7. A document preparation apparatus according to claim 6, wherein the information input by said input means are in a natural language.

8. A document preparation apparatus according to claim 6, wherein the question provided by said output means is in a natural language.

9. A document preparation apparatus according to claim 6, wherein said document preparation means prepares a letter according to the word input by said input means.

10. A document preparation apparatus according to claim 6, further comprising second control means for controlling said output means to output a request in order to obtain information relating to the answer from the user, for controlling said database means to store information received in response to the request, and for controlling said document preparation means to prepare the text based on the answer and the information received in response to the request.

* * * * *

UNITED STATES PATENT AND TRADEMARK OFFICE
CERTIFICATE OF CORRECTION

PATENT NO. : 5,627,940

DATED : May 6, 1997

INVENTOR(S) : ARUNA ROHRA ET AL.

It is certified that error appears in the above-identified patent and that said Letters Patent is hereby corrected as shown below:

In the Drawings:

<u>FIGURE 4</u>

"May I know." should read --May I know--.

<u>COLUMN 2</u>

Line 66, "receive," should read --receiver,--.

<u>COLUMN 3</u>

Line 17, "known," should read --know,--.
Line 65, "ads" should read --adds--.

<u>COLUMN 6</u>

Line 19, "are" should read --is--.

Signed and Sealed this

Third Day of March, 1998

*Attest:*

BRUCE LEHMAN

*Attesting Officer*   *Commissioner of Patents and Trademarks*